No. 753,802. PATENTED MAR. 1, 1904.
E. C. MORGAN.
COMBINED THIRD AND TRACTION RAIL FOR ELECTRIC RAILWAYS AND SWITCHING SYSTEM EMBODYING SAME.
APPLICATION FILED AUG. 27, 1902.
NO MODEL.
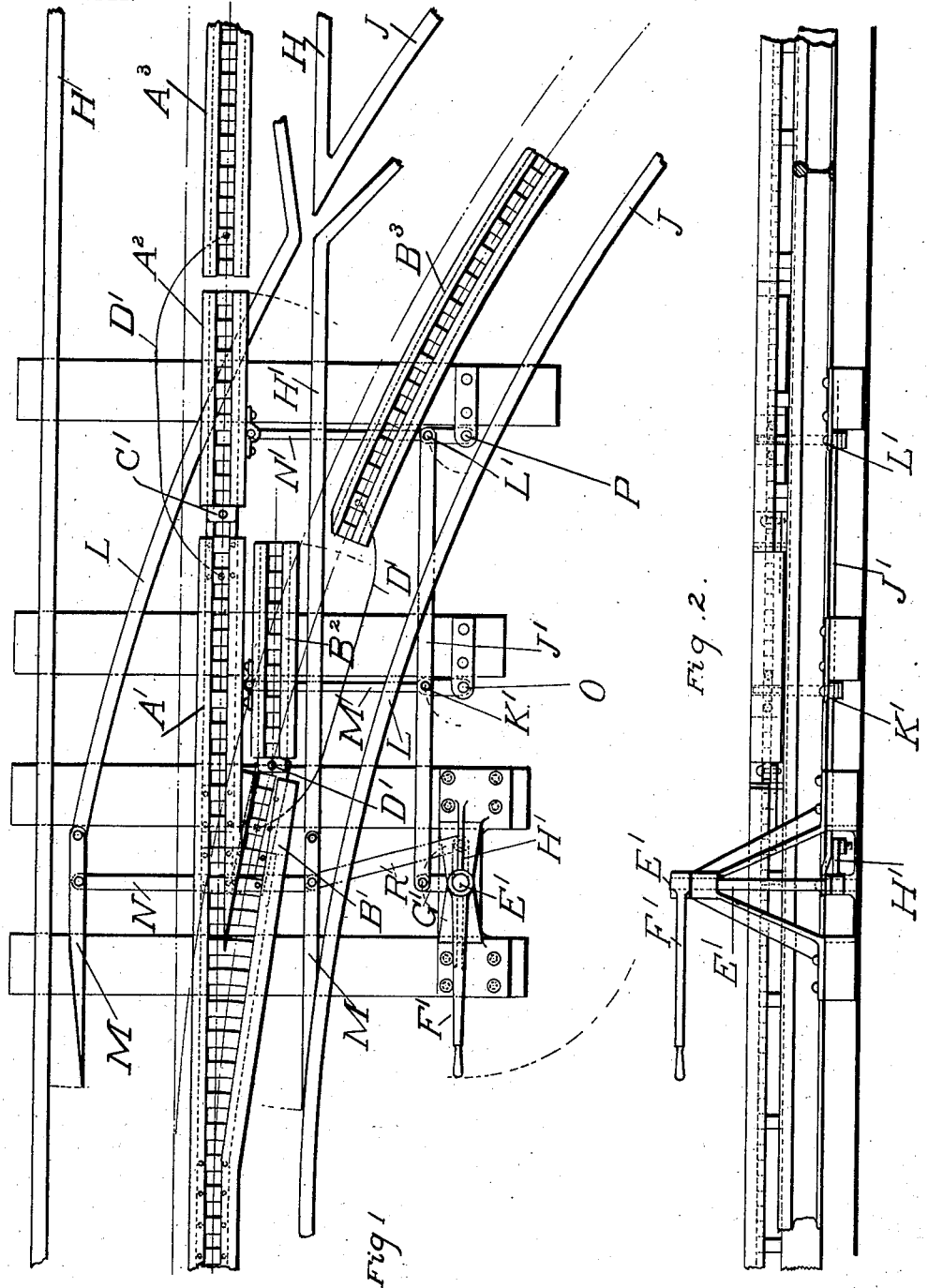
WITNESSES:
J. H. Morgan Jr.
E. C. Semple.
INVENTOR
Edmund C. Morgan
BY
Brown & Darby
ATTORNEYS No. 753,802.

Patented March 1, 1904.

UNITED STATES PATENT OFFICE.

EDMUND C. MORGAN, OF CHICAGO, ILLINOIS, ASSIGNOR, BY MESNE ASSIGNMENTS, TO MORGAN ELECTRIC MACHINE COMPANY OF WEST VIRGINIA, OF CHICAGO, ILLINOIS, A CORPORATION OF WEST VIRGINIA.

COMBINED THIRD AND TRACTION RAIL FOR ELECTRIC RAILWAYS AND SWITCHING SYSTEMS EMBODYING SAME.

SPECIFICATION forming part of Letters Patent No. 753,802, dated March 1, 1904.

Application filed August 27, 1902. Serial No. 121,193. (No model.)

*To all whom it may concern:*

Be it known that I, EDMUND C. MORGAN, a citizen of the United States, residing at Chicago, in the county of Cook and State of Illinois, have invented a new and useful Combined Third and Traction Rail for Electric Railways and Switching Systems Embodying the Same, of which the following is a specification.

This invention relates to a switching system for combined third and traction rails for electric railways.

The object of the invention is to simplify and improve the construction of devices of this nature and to render the same more efficient in operation.

A further object of the invention is to provide means whereby in a combined third and traction rail for electric railways the third rail serves not only as a conductor for supplying current to the motor on the truck, but also is constructed and arranged to be engaged by gearing carried by the truck and operated by the motor thereon for causing the truck to move along the track, and wherein in a system of the character referred to the truck may be readily switched from one track to another or others.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in plan, parts broken off, of a combined third and traction rail for electric railways and a switching system embodying the same constructed and operating in accordance with the principles of my invention. Fig. 2 is a side elevation of the construction shown in Fig. 1, parts being broken off.

In the accompanying drawings, showing one form of apparatus embodying the principles of my invention, H designates main-track rails, and J designates the rails of a branch line communicating with the main-track rails H by means of a switch. The switch-track rails comprise fixed curved portions or parts L, and the pivotal sections or portions M are so relatively arranged that when the pivoted sections M are swung into one position—as, for instance, the position shown in Fig. 1—the main track is clear for a truck to pass therealong; but when said pivoted track portions M are swung in the other direction the truck will be switched from the main track H to the switch or branch track J. The pivotal portions M are connected together by means of a bar N, so as to move in unison, and the shifting or swinging of the pivoted track-sections is effected by mechanism presently to be more fully explained.

As shown and as above indicated, the combined third and traction rail is arranged between the track-rails, and each pair of track-rails is supplied or provided with a third or traction rail.

In order to permit of the use of a combined third and traction rail, and especially at the junction of a branch or connecting line, it is necessary to make provision for a constant engagement of the driving-wheel on the truck with the combined third and traction rail while passing over the switch, and in order to enable this result to be accomplished the combined third and traction rail is placed over the switching-rails, so that when the truck progresses along any particular pair of track-rails a continuous combined third and traction rail is provided. This, however, necessitates a shifting of the combined third and traction rail from the position over the switching-track rails when it is desired to shift the truck from one pair of track-rails to another. Therefore in carrying out my invention the combined third and traction rail employed with each pair of track-rails is made in sections. For instance, the main-track rails H are provided with the three sections of combined third and traction rails, designated, respectively, $A'$, $A^2$, and $A^3$, and similarly the switching-track rails L and switch-track rails J are provided with a combined third and traction rail composed of the three sections $B'$, $B^2$, and $B^2$. The sections A² and B² are made movable or shiftable, so that the same may be shifted or moved as desired in order to clear the tracks over which said sections are placed. For instance, and as shown in Fig. 1, the section A² of combined third and traction rail is arranged in alinement with the sections A' A³ and over one of the switching-track rails L, so as to permit a truck to pass freely along the main-track rails H. At the same time the section B² of the switching portion of the combined third and traction rail is shifted or moved out of alinement with the portions B' B³ and clear of the portion H' of the main-track rail. This is the relative position of the movable sections of the combined third and traction rail when the movable or pivoted sections M of the switching-rails are in the position shown—namely, that which presents a free track along the main-track rails H. When, however, it is desired to shift the truck from the main-track rails H to the branch-track rails J, it is necessary to shift the section A² clear of the switching-track section L, so as to enable the truck-wheels to pass over said switching-track rails, and at the same time it is necessary to shift the section B² of the combined third and traction rail associated with the switch or branch track rails J into position of alinement with respect to the sections B' B³. In other words, when the truck is operating over the main-track rails H the section or portion A² of the combined third and traction rail associated with the track-rails H must be shifted into alinement with the sections A' A³ of said combined third and traction rail and the section B² shifted into position to clear or free the portion H' of the track-rails, and when the truck is to proceed along the switching-rails L and the switch or branch track rails J it is necessary to shift the section B² of the combined third and traction rail associated with the switching and switch tracks into alinement with the sections B' B³ and also to shift or move to one side and out of the way the section A². In order to enable this shifting to be accomplished readily and easily, the sections A² B² are pivotally connected, respectively, to the sections A' B', as indicated at C' D', respectively, said sections A² B² being maintained, through such pivotal connection, in constant electrical connection with the sections A' B', respectively, and in order to prevent a break in the circuit due to the free ends of sections A² B² being disconnected with their corresponding continuing connections A³ B³, respectively, said sections A³ B³ may be maintained in electrical connection with sections A' B', respectively, in any suitable or convenient manner—as, for instance, by connecting-cables D'. The movable sections A² B² of the combined third and traction rail may be shifted in any suitable or convenient manner. Preferably, and as shown, said sections are simultaneously shifted, so that when one of the sections is in position to be in commission the other section is in a clear or free position and out of commission relation.

I have shown a simple arrangement for effecting the shifting of the sections A² B² coincidently with the shifting of the switching-track sections M; but my invention is not to be limited or restricted to the particular form of mechanism for effecting such coincident and corresponding shifting of the switching-track and combined third and traction rail sections, as the desired result and operation may be secured in many other ways. In the particular form shown I employ a rotatable shaft E' with an operating-handle F', and I mount on said shaft E' suitable arms or projections G' H', arranged to extend in suitable relation with respect to each other. To the arm G', I connect one end of a bar J', said bar being pivotally connected, as at K' L', with levers or arms M' N', respectively pivoted to the sections B² A². The levers or arms M' N' are fulcrumed, as at O P, to some convenient fixed point—as, for instance, a track tie or sleeper. The arm H' on shaft E' is connected through a rod or link R to bar N, through which the switching-track sections M are operated.

From the foregoing description it will be seen that when the arm F' is swung in one direction or the other there is a coincident movement imparted to the several swinging track and combined third and traction rail sections M A² B², so as to cause said sections to move not only coincidently but coöperatingly into the desired or required positions.

Having now set forth the object and nature of my invention and a construction embodying the principles thereof, what I claim as new and useful and of my own invention, and desire to secure by Letters Patent, is—

1. In an apparatus of the class described, and in combination with main and branch track rails and switching-track rails, of a combined third and traction rail for each pair of track-rails, said combined third and traction rails each made in sections, one section of each third and traction rail being movable, as and for the purpose set forth.

2. In an apparatus of the class described, and in combination with main and branch track rails and switching-track rails, of a combined third and traction rail for each pair of track-rails, said combined third and traction rails each made in sections, one section of each third and traction rail being movable, and means for simultaneously shifting or moving said movable sections into corresponding and coöperating relation with respect to said track-rails, as and for the purpose set forth.

3. In an apparatus of the class described, track, switching and switch rails, said switching-rails provided with movable sections, in combination with a combined third and traction rail for each pair of track-rails, said traction-rails made in sections, one section of each traction-rail being pivoted, whereby it may be shifted or swung into and out of alinement with its coöperating sections, and connections between said pivoted traction-rail sections and said pivoted switching-sections, whereby all of said sections are moved in unison, as and for the purpose set forth.

4. In an apparatus of the class described, main and branch track rails and switching-track rails, the latter provided with pivoted sections, in combination with combined third and traction rails for each pair of track-rails, said traction-rails made in sections, one of said sections being pivoted, the pivoted sections of said traction-rails operating over portions of said track-rails, and connections between all of said pivoted sections whereby said sections may be coöperatingly shifted to move said traction-rail sections out of the way and into proper relation according to the track-rails along which a truck is to proceed, as and for the purpose set forth.

5. In a device of the class described, track-rails having movable switch-points, fixed traction-rails disposed between the track-rails, a movable section of traction-rail, and means for simultaneously moving said movable section with the switch-points.

In witness whereof I have hereunto set my hand, this 7th day of August, 1902, in the presence of the subscribing witnesses.

EDMUND C. MORGAN.

Witnesses:
C. H. SEEM,
S. E. DARBY.